Figure 1:
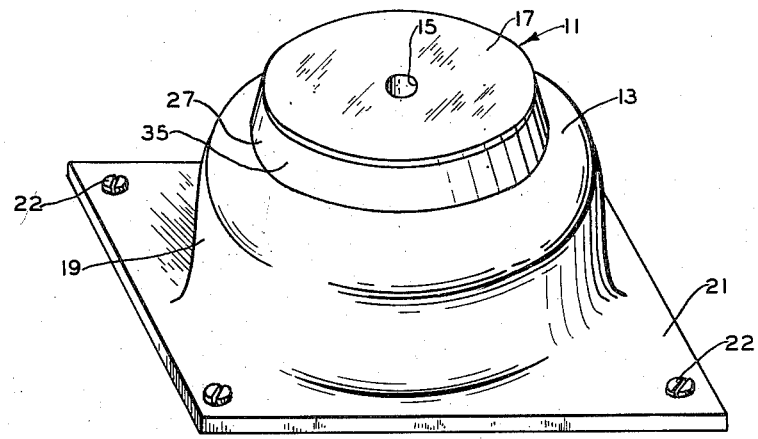

Feb. 6, 1951 N. E. LEE 2,540,130
SUPPORT
Filed Jan. 10, 1945

*INVENTOR.*
NORMAN E. LEE
BY
*William D. Hall*
ATTORNEY

Patented Feb. 6, 1951

2,540,130

UNITED STATES PATENT OFFICE 2,540,130

SUPPORT

Norman E. Lee, Red Bank, N. J.

Application January 10, 1945, Serial No. 572,204

6 Claims. (Cl. 248—358)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to supports and more particularly to improvements in supporting means of the type used to sustain a load relative to a base, so as to prevent or at least minimize the transmission of vibrations, shocks and noises between said load and base.

Vibration and shock mounts of the prior art, although used in tremendous quantities, have been found to be badly defective in performing their intended purposes.

Some mounts are capable of curtailing the transfer of vibrations of relatively high frequency, but are unsatisfactory because they allow vibrations at the resonant or natural frequency of the supported load to be so greatly amplified as to be seriously detrimental.

Some operate to attenuate vibrations or shocks only in one mode of movement and are, therefore, unsuited to installations which require attenuation in several modes.

Some are equipped with snubbers which come into play suddenly when the load is deflected beyond a certain amplitude and, therefore, set up counterforces which often are more destructive than the vibrations and shocks they are intended to absorb.

Again, some mounts are so designed that, if the spring material (such as rubber) is injured as by tearing or there is a separation of a bond between the spring material and the metal, the mounted equipment may separate entirely from the base and be severely damaged.

Some supports, having hydraulic systems comprising a cylinder and a piston operating therein, have excellent damping characteristics, but are relatively large in size and are expensive to manufacture and keep up, and also permit leakage of the hydraulic medium therefrom.

Some installations require mounts which will protect against a number of different kinds of impulses. For instance, in aircraft sensitive apparatus must be shielded from forced vibrations of the engines and associated parts, at various speeds including the resonant frequency, and also from sudden shocks occurring in rough air and when landing.

In marine installations, provision must be made not only for the vibrations set up by the engines, shafts and propellers, which operate at different speeds, usually of lower frequencies than in aircraft, but also for pitching and rolling of the vessel.

In vehicular installations the problem is more complicated as the supports must provide protection against forced vibrations of the engines and associated parts, at varying speeds including the natural frequency, vibrations due to minor irregularities of the road beds traversed by the vehicle, which usually have abrupt wave-forms, and shocks due to holes and abnormal irregularities in the road surfaces. These conditions are greatly exaggerated in the case of military vehicles which often must cover terrain far rougher than other vehicles and which may also be subjected to ballistic impacts and concussions.

It is intended in the present invention to provide a shock and vibration support which is not attended by these defects of earlier mounts.

It is an object of the present invention to provide means for supporting equipment which will be soft and resilient enough to isolate high frequency vibrations, and which will damp and absorb vibrations in the resonant frequency range as well as shocks of relatively large force and large amplitude.

It is another object to provide a support which incorporates both a shock absorbing system and a spring system in a single unit.

It is still another object to provide such a support wherein the operation of the absorbing system follows from the action of the spring system.

It is a still further object to provide such a mount wherein, natural rubber, or a similar material, may be used as the spring system and wherein deformations of said material are utilized to accelerate the functioning of the shock absorption system.

It is a further object to provide a supporting means which will cushion displacements caused by different modes of movement, such as vertical, horizontal and rotational.

It is also an object to provide a mount which, despite unusual vibrations and shocks, and wear and tear, will not allow the equipment sustained thereby to tear loose entirely from the base.

It is a further object to design mounts which will use natural or synthetic rubber and suitably combine tensional, compressional and shearing forces thereof so as to best utilize some of the advantages of each.

Another object is to employ hydraulic damping in a mounting device which is small in size relative to earlier hydraulic mounts, and which incorporates no mechanical parts moving against each other so as to cause wear and resultant changes in operating characteristics and replacement of parts, and which will not allow leakage of the hydraulic medium.

Still another object is to provide a mount whose external dimensions allow it to be substituted for conventional mounts without necessitating changes in either the base or the load.

A still further object is to provide a shock mount designed to absorb and attenuate shocks to such a degree as to eliminate the need of snubbers and thereby avoid the countershocks frequently caused thereby.

It is still another object to provide a mount wherein metal to metal contacts are eliminated and hence the transfer of sound, as well as vibration and shock, is inhibited.

The foregoing objects, and others which will become clear from the following specification, are accomplished by a mount of the type illustrated in the drawings. Generally the illustrated embodiment comprises a metal spool and a metal washer, which are fastened to the base and to the load to be insulated from each other. The spool is made up of a cylindrical core provided with a plate at each end. The washer encircles the core and its internal diameter is greater than the outside diameter of said core, but less than the external diameter of the end plates, so that said washer is imprisoned upon said core and intermediate said end plates. The washer and spool are joined to each other by spring material, such as natural or synthetic rubber, which is interposed between the said parts and is suitably bonded directly to the metal. Two chambers are left in said spring material, one above and the other below the washer, and constricted apertures are provided to allow intercommunication between said chambers. The chambers may be filled with a fluid, either gaseous or liquid or both.

The spring system isolates high frequency vibrations such as those resulting from the operation of internal combustion engines, some minor road irregularities, and the like. The hydraulic system has practically no damping effect under these conditions. However, when impulses of greater force and amplitude occur, as those resulting from the operation of engines in the resonant frequency range or at lower frequencies, or those which are due to severe road irregularities or ballistic shocks, the hydraulic damping system comes into play to attenuate and absorb them, the energy being dissipated in forcing the fluid back and forth through the restricted apertures and in heat generated thereby.

Figure 2:
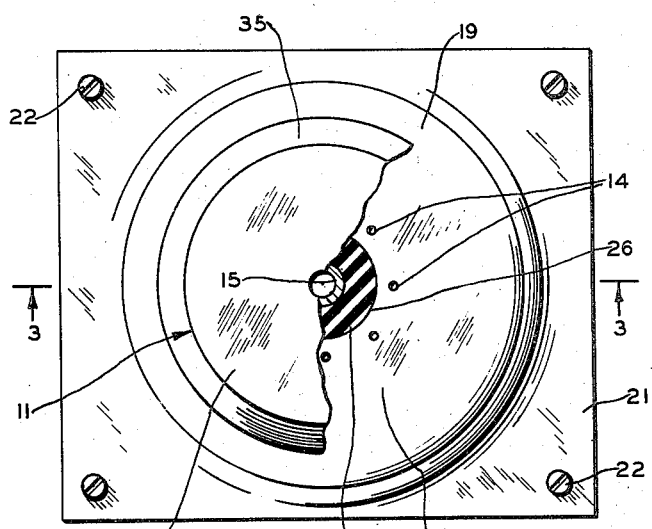
Figure 3:
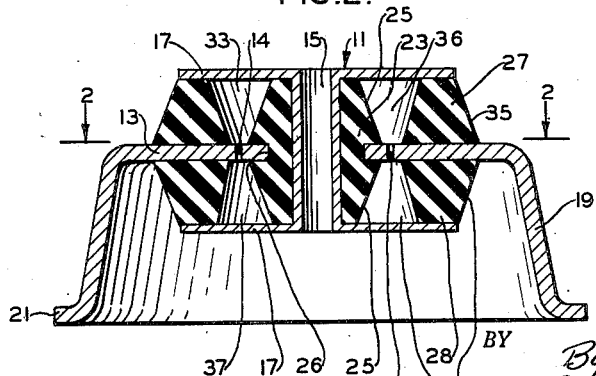

A typical embodiment of the present invention is shown in the accompanying drawings, wherein Figure 1 is a cabinet view of a support;

Figure 2 is a plan view of the support of Figure 1, the parts being partly sectioned along the line 2—2 of Figure 3; and Figure 3 is a vertical section taken along the line 3—3 of Figure 2.

Referring to the drawings, the mount illustrated includes a spool 11 and a flat metal washer 13. The spool 11 comprises a central tubular metal core 15 and a pair of flat circular metal end plates 17 secured to the opposite ends of, and at right angles to, the core. The end plates 17 have central apertures, in register with the hollow interior of the core 15, to allow the insertion of a through bolt or other fastening means (not shown). The washer 13 is pierced by several small apertures 14 disposed in a circle a short distance from the inner periphery of said washer. The outer periphery of the washer 13 is secured to a skirt-like housing 19 which extends divergingly downwardly and then extends outwardly so as to form a flat flange 21 of square outer configuration, parallel to said washer. Said flange 21 is provided with several holes to accommodate fastening means 22.

The core 15 and the end plates 17 are shown as a single piece of metal in the drawings, but it will be understood that in actual production they will probably be made of several components joined together so as to allow the mount to be fabricated in compliance with suitable manufacturing procedures. Although the washer 13, the housing 19 and the flange 21 may be made separately and then joined together, they will preferably be stamped out or otherwise made as a unitary member as shown in the drawings.

An inner ring 23 of resilient material, such as natural or synthetic rubber surrounds the core 15 and is bonded to said core and to the end plates 17 and also to the inner peripheral portion of the washer 13. Said inner resilient ring 23 is of greatest outer diameter at its central portion and tapers inwardly toward both its upper and lower ends so as to form the two truncated conical surfaces 25. The central portion of the inner resilient ring 23 is provided with a peripheral channel 26 which receives the washer 13, and in which the inner peripheral portion of said washer is bonded as aforesaid.

Interposed between the washer 13 and the end plates 17 respectively are a pair of outer rings 27, 28, which are also of resilient material, and which are of greater diameter than, and are spaced from, the inner resilient ring 23. Each of said outer resilient rings 27, 28 is trapezoidal in cross section, having its relatively wide surface bonded to the washer 13 and its relatively narrow surface bonded to one of the end plates 17. Each of said outer resilient rings 27, 28 is further defined by a truncated conical inner surface 33 and a truncated conical outer surface 35.

It is now seen that two annular chambers 36, 37 are formed, positioned respectively above and below the washer 13. The said chambers 36, 37 are filled with a suitable hydraulic medium (not shown) and are connected by the restricted apertures 14. The hydraulic medium is preferably made up of a liquid, such as oil of a type which will not deleteriously affect the resilient material.

In the operation of the mount just described, the flange 21 may be secured by means of suitable fastening means 22 to one of the parts to be isolated. The spool 11 may be secured to the other part to be isolated by means of a bolt (not shown) through the hollow core 15. Ordinarily, the spool 11 will be secured to the load to be protected, such as sensitive electrical equipment, and the washer 13 will be secured to the base. However, the spool 11 may be secured to the base and the washer 13 to the load. If connected in the first mentioned order, vibrations and shocks imparted to the base will cause the washer 13 to oscillate.

When the washer 13 moves upwardly, the upper outer resilient ring 27 is under compression, the lower outer resilient ring 28 is under tension and the inner ring 23 is pushed upwardly along its outer periphery so as to be subject to a shearing stress. Simultaneously the volumetric capacity of the upper chamber 36 is reduced and that of the lower chamber 37 is increased, causing a flow of the hydraulic medium from the upper to the lower chamber.

When the washer 13 moves downwardly, the outer rings 27, 28 are respectively under tension and compression, the inner ring 23 is stressed in shear in a downward direction, and the hydraulic medium is caused to flow from the lower chamber 37 to the upper chamber 36.

When the washer 13 is subjected to vibrations of high frequency the spring system, comprising the resilient rings 23, 27 and 28, will isolate the spool 11 and the load supported thereby from such vibrations. The flow of hydraulic fluid will then be so slight as to have practically no effect upon the operation of the said spring system. However, when vibrations of lower frequency, and particularly in the resonant range of the suspended load, occur, or when the base is subjected to shocks of considerable force and amplitude, the said spring system alone is unable to protect the load. It is then that the hydraulic damping system comes into play. The destructive energy is absorbed and dissipated in forcing the hydraulic fluid through the restricted apertures 14, some of the energy being thrown off in heat.

The steady energy absorption by the hydraulic system, combined with the increasing recovery force stored up in the spring system, as the amplitude of deflection increases, results in a delay of the deflection, thereby keeping the amplitude of deflection of the load within the predetermined limits of the particular mount. Thus, by a steadily increasing storage and absorption of energy, the vibrations and shocks are attenuated without the use of snubbers of any kind, which may act with an injurious abruptness.

An important feature of the present invention is that axial deflections of small amplitude cause a relatively large change in the volumetric capacities of the two chambers 36, 37. This is accomplished by the fact that deformations of the rubber or like material are used to accelerate the increase of volumetric capacity of one chamber 36 or 37 while accelerating the decrease of the other. In the mount, illustrated in the drawings, the conical surfaces 25, 33 of the resilient rings 23, 27, 28 will bulge outwardly when said rings are under compression and will curve inwardly when under tension. Thus, when the washer 13 is moved upwardly, the upper chamber 36 decreases in size vertically. At the same time it decreases in size horizontally as the two conical surfaces 25, 33 bulge toward each other. Simultaneously, the lower chamber 37 increases in size both vertically and horizontally, the horizontal increase being due to the fact that the conical surfaces 25, 33, defining the said lower chamber, curve inwardly, away from each other. This acceleration of change in volumetric capacities is particularly advantageous where a hydraulic medium of low viscosity is used, as it results in a more rapid flow of the medium through the restricted apertures 14. Low viscosity liquids are sometimes preferable because they are more satisfactory over greater temperature ranges.

The support described also operates in modes at right angles to the axial mode already discussed. Thus, horizontal deflections of the base and washer 13 will result in tension on one side of the inner resilient ring 23 and compression on the opposite side. The outer rings 27 and 28 are then stressed in shear. Here, as in axial movements, the deflections are curtailed without the use of snubbers.

As previously pointed out, tensional, compressional and shear stresses of the resilient material are combined in the illustrated embodiment. Resilient material, such as natural rubber, loses some of its effective elasticity when under compression and it makes for a relatively stiffer mount than when it is utilized under tension or in shear. On the other hand, the material is less liable to permanent deformative set or drift when under compression than it is when under tension or shear. The characteristics of softness, maximum elasticity, etc. obtained by using the material in tension or shear are obtained in the present support, without the usual concomitant disadvantages. For example, in axial deflections of the mount, one of the outer resilient rings 27, 28 is primarily in tension while the other is primarily in compression and the inner resilient ring 23 is primarily in shear. The result is that each acts to compensate the other. The resilient material of the ring mainly under tension is not unduly elongated, the material of the ring mainly under compression is not unduly compressed so as to become too hard, and the shearing stress in the inner ring 23 is left within safe and effective limits. The result is that all of the resilient rings are kept within optimum working limits and the spring system is kept relatively soft to keep the resonant frequency low and thereby give better attenuation of high frequency vibrations.

Although a particular mount will obviously be designed with certain loads and vibrations and shocks in mind, it is possible that a mount may be subjected to unanticipated conditions, or it may be used beyond the intended useful life span of its resilient material. Should this occur the resilient material may conceivably rupture or the bond between one of the resilient rings 23, 27, 28 and the washer 13 or spool 11 may let go. Nevertheless, the load would not separate from the base and fly into space as the washer 13 is imprisoned upon the spool 11.

The hydraulic medium of the preferred embodiment is a suitable liquid. However, it may sometimes be advisable to use a hydraulic liquid combined with a small amount of air. This might be deemed helpful as deformation of the shape of the chambers 36, 37 during operation may change the total combined volumetric capacity of the two chambers. As the hydraulic liquid will be virtually incompressible, the air will relieve excessive pressure. The air will also compensate for pressure changes due to temperature variations. Where liquid alone is used, the resilient material will deform sufficiently to maintain a constant total volumetric capacity for the two chambers 36, 37.

A highly viscous material may be used for the hydraulic medium in which event the apertures 14 will be enlarged. The hydraulic medium may also be a gas, such as air, if an appropriate throttling means is used. Satisfactory results have been obtained with this medium.

A modified form of the device shown in the drawings would have no apertures between the two chambers, but each chamber would communicate with the circumambient atmosphere through suitable restricted apertures (not shown) such as holes through the end plates 17. Damping would then be accomplished by forcing air in and out of the two chambers 36, 37 through such apertures. Also, if air is used as the hydraulic medium and the apertures lead to the outside of the mount as just suggested, one chamber may be eliminated entirely.

Another modification of the device shown would be constructed without bonding the inner resilient ring 23 to the spool 11.

Although the embodiment shown in the drawings has a particular geometry, it will be understood that various changes in the geometry might be made within the spirit of the invention. For instance, the resilient rings 23, 27, 28 might be formed with convexly bulged surfaces in place of the conical surfaces 25, 33, 35. Such construction would further accelerate the speed of change of the volumetric capacities of the chambers 36, 37. Also, to make for a softer mount, better adapted to isolate high frequency vibrations, the cross sectional configurations of the resilient rings 23, 27, 28 might be increased in size vertically and decreased horizontally. Such changes and others would, of course, have to be made to suit the mount of the present invention to different compounds of natural and synthetic rubber.

Although not shown in the illustrated embodiment it would be advisable to incorporate a means for injecting the hydraulic medium after the support is assembled.

While there have been described what at present are considered preferred embodiments of the present invention it will be obvious to those skilled in the art that various changes and modifications may be made therein without departing from the invention and it is, therefore, aimed in the appended claims to cover such changes and modifications as fall within the true spirit and scope of the invention.

What is claimed is:

1. A support for resiliently supporting a load relative to a base, comprising a spool of metal, said spool comprising a core and two end plates secured to said core and spaced from each other, a washer of metal encircling said core and disposed between said end plates, resilient material disposed between said spool and said washer, said material being adapted to allow the spool and the washer to move relative to each other, but not to come into contact with each other, two chambers disposed between the washer and the respective end plates of the spool, a hydraulic medium within the chambers, a passageway connecting the two chambers to allow the hydraulic medium to flow between the chambers.

2. A vibration support to sustain a load relative to a base comprising a metal spool, said spool including a core and two end plates secured to the core at its opposite ends, a metal washer disposed intermediate said end plates and encircling said core, its inner periphery being spaced from the core, a ring of resilient material surrounding the core, and bonded to both the core and the inner peripheral portion of the washer, two outer rings of resilient material encircling and spaced from the inner ring, one disposed between the washer and one end plate and bonded to said washer and end plate and the other similarly disposed between and bonded to the washer and the other end plate, two enclosed chambers between the inner ring and the two outer rings, respectively on opposite sides of the washer, a hydraulic medium within said chambers, passage means between the two chambers to allow the said hydraulic medium to flow between said chambers.

3. A vibration support to sustain a load relative to a base comprising a metal spool, said spool including a core and two end plates secured to the core at its opposite ends, a metal washer disposed intermediate said end plates and encircling said core, its inner periphery being spaced from the core, a ring of resilient material surrounding the core and disposed between the end plates, and bonded to both the end plates and the washer, two enclosed chambers formed at least partly within said resilient material, one disposed between the washer and one end plate and the other between the washer and the other end plate, a hydraulic medium within said chambers, passage means between the two chambers to allow the said hydraulic medium to flow between said chambers.

4. A vibration support comprising a spool including a core and two end plates secured to said core and spaced from each other, a washer encircling said core intermediate said end plates, said washer being pierced by an aperture sufficiently large to allow the core free operational movement therethrough and sufficiently small to prevent the passage therethrough of both of the end plates, a spring system coupling said spool to said washer, said spring system including resilient rubber-like material interposed between the spool and the washer, and hydraulic damping means including two chambers located respectively between the opposite sides of the washer and the two end plates, a hydraulic medium within the chambers and a restricted passageway connecting the two chambers to allow the hydraulic medium to flow between said chambers.

5. A vibration support comprising a spool including a core and two end plates secured to said core and spaced from each other, a washer encircling said core intermediate said end plates, said washer being pierced by an aperture sufficiently large to allow the core free operational movement therethrough and sufficiently small to prevent the passage therethrough of both of the end plates, a spring system coupling said spool to said washer, said spring system including resilient rubber-like material interposed between the inner periphery of the washer and the core and between the opposite surfaces of the washer and the respective end plates, and hydraulic damping means including two chambers located respectively between the opposite sides of the washer and the two end plates, a hydraulic medium within the chambers and a restricted passageway connecting the two chambers to allow the hydraulic medium to flow between said chambers.

6. A vibration support to sustain a load relative to a base, comprising a metal spool, said spool including a core and two end plates secured to the core at its opposite ends, a metal washer disposed intermediate said end plates and encircling said core, its inner periphery being spaced from the core, a ring of resilient material surrounding the core and disposed between the end plates and the opposite sides of the washer, two enclosed chambers formed at least partly within said resilient material, one disposed at least partly between the washer and one end plate and the other at least partly between the washer and the other end plate, a hydraulic medium within said chambers, and passage means between the two chambers to allow the said hydraulic medium to flow between said chambers.

NORMAN E. LEE.

REFERENCES CITED

The following references are of record in the file of this patent:

UNITED STATES PATENTS

| Number | Name | Date |
|---|---|---|
| 1,683,351 | Herr | Sept. 4, 1928 |
| 2,018,860 | Lord | Oct. 29, 1935 |
| 2,147,660 | Loewus | Feb. 21, 1939 |
| 2,211,416 | Goldsmith | Aug. 13, 1940 |
| 2,295,829 | Carlson | Sept. 15, 1942 |
| 2,351,427 | Henshaw | June 13, 1944 |
| 2,375,105 | Hile | May 1, 1945 |
| 2,386,463 | Hile | Oct. 9, 1945 |
| 2,387,065 | Harding | Oct. 16, 1945 |
| 2,387,066 | Harding | Oct. 16, 1945 |